Dec. 2, 1969   K. HORN   3,481,299
CONTROL APPARATUS
Filed Dec. 1, 1967   2 Sheets-Sheet 1

INVENTOR.
KURT HORN
BY Bruce C. Lutz
ATTORNEY

INVENTOR.
KURT HORN
BY Bruce C Lutz
ATTORNEY

United States Patent Office 3,481,299
Patented Dec. 2, 1969

3,481,299
CONTROL APPARATUS
Kurt Horn, Azusa, Calif., assignor to Honeywell Inc., Minneapolis, Minn., a corporation of Delaware
Filed Dec. 1, 1967, Ser. No. 687,235
Int. Cl. B63h 25/42
U.S. Cl. 114—144                                1 Claim

ABSTRACT OF THE DISCLOSURE

A control system for a vessel such as a ship whereby the vessel is positioned via engines which cannot be reduced in minimum thrust below a predetermined finite level, which one set of which are always uniquely situated with respect to the remaining engines and which are located on opposite sides of a center of rotation of the vessel.

---

The invention herein described was made in the course of or under a contract or subcontract thereof with the Navy.

The present invention is concerned generally with electronics and more specifically with a control system for positioning a ship or other vessel in any direction with respect to a stationary or a moving reference frame including yaw or rotation wherein a requirement of the system is that the positioning engines have unique directions of thrust and cannot be reduced below a prescribed minimum thrust.

It is thus an object of the present invention to provide an improved control system for vessel positioning.

Other objects and advantages will be ascertained from a reading of the specification and claim in conjunction with the drawings wherein:

Figure 1:
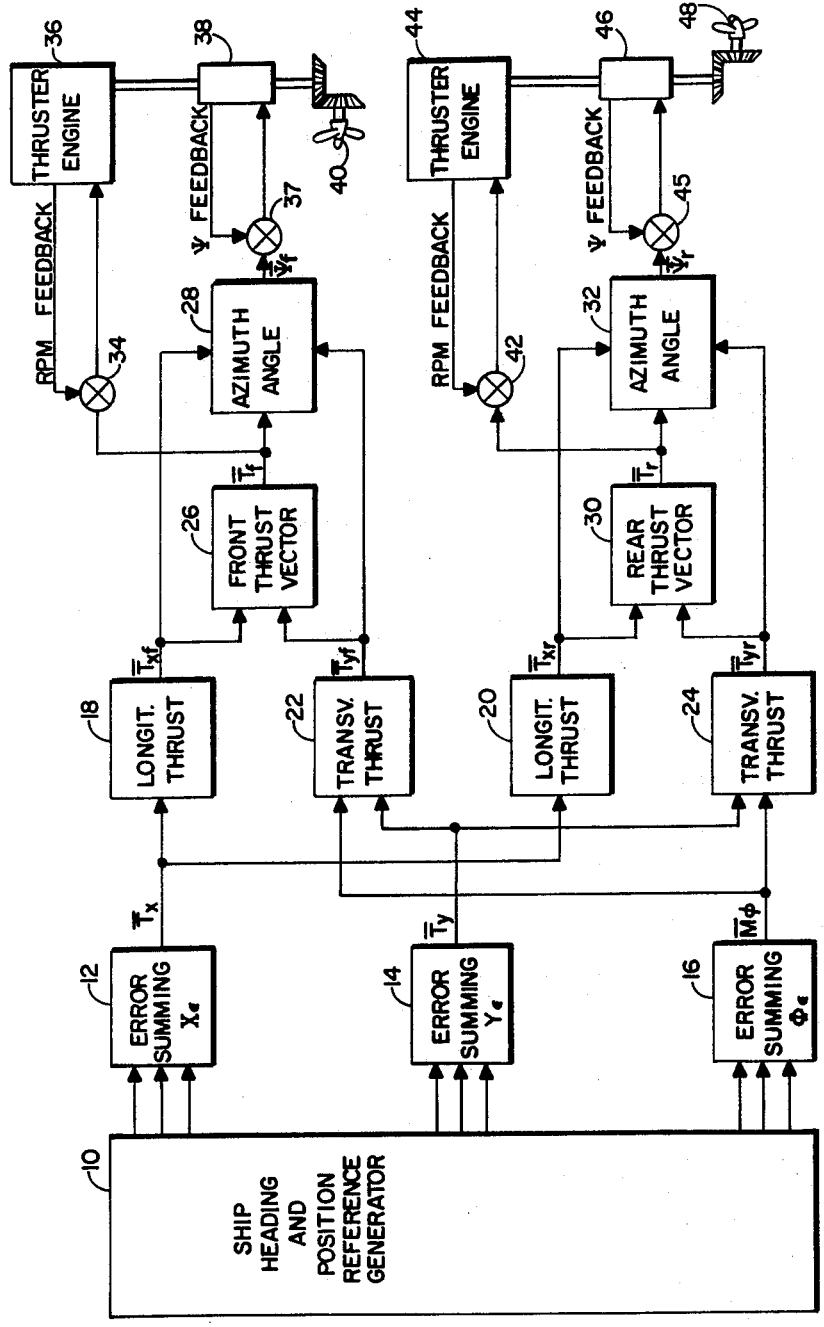
FIGURE 1 is a system block diagram of the control unit.

A heading and position reference generator generally designated as 10 in FIGURE 1 supplies a plurality of outputs to three error summing blocks 12, 14, and 16 which are representative of longitudinal or x, transverse, abeam or y, and moment, yaw of angle error signal summing blocks respectively. While only three inputs are shown to each of the summing blocks 12–16 from the generator 10, it is to be realized that there may be more or less. The generator 10 may provide outputs representative of wind velocity, gyro signals, compass heading signals, and desired position information in terms of position error, velocity error and integrated position error. The error summing block 12 which provides information for the $x$ direction provides an output labeled $\overline{T}_x$ which is supplied to longitudinal thrust blocks 18 and 20. Block 18 is in the forward thruster section while block 20 is in the reverse thrust section. The error summing block 14 which provides signals indicative of desired movements in the Y direction provides an output $\overline{T}_y$ to first and second transverse thrust blocks 22 and 24. Block 22 represents the forward thrusters, block 24 the rearward thrusters. The error summing block 16 which provides an output $\overline{M}_\theta$ indicative of the desired rotation of the ship supplies inputs to the transverse thrust blocks 22 and 24. Longitudinal thrust block 18 provides an output $\overline{T}_{xf}$ which is supplied both to a front thrust vector block 26 and to an azimuth angle block 28. The transverse thrust block 22 provides an output $\overline{T}_{yf}$, indicative of the sum of the inputs, to blocks 26 and 28. The longitudinal thrust block 20 provides an output $\overline{T}_{xr}$, to rear thrust vector block 30 and to a second azimuth angle block 32. The transverse thrust block 25 provides an output $\overline{T}_{yr}$, indicative of the difference of the two inputs, to the two blocks 30 and 32. Front thrust vector block 26 provides an output $\overline{T}_f$ to block 28 and also to a summing point 34 which supplies an output to a forward thruster engine 36. A feedback signal indicative of r.p.m. or thrust is supplied from engine 36 to the summing means 34. Internal to the block 36 is a condition responsive governor means to receive the input from summing means 34 and to hold the speed of the engine at a value indicative of the total of the signals received so far. The r.p.m. feedback signal may be generated from various devices such as a tachometer. An output from azimuth angle block 28 is shown as $\psi_f$ and is supplied through a summing means 37 to a block 38. Block 38 is situated between the thruster engine 36 and a propeller or propulsion means 40 and is mechanically connected to each. Block 38 serves to reposition the direction of propulsion means 40 in accordance with the signal $\psi_f$. An output of block 38 is applied to a summing means 37 as $\psi$ feedback. Again, internal to block 38 is some type of means which is rotationally responsive to the input signal and includes means for providing a feedback signal indicative of the position of the propulsion means 40. Such a means could be a potentiometer with a wiper attached to the mechanical connection between the thruster engine 36 and the propulsion means 40 to indicate the direction of the propulsion means 40.

An output $\overline{T}_r$ of the rear thrust vector 30 is supplied as an input to azimuth angle block 32 and is also supplied to a summing means 42 whose output is supplied to a second thruster engine 44. Engine 44 also has an r.p.m. feedback which in this case is supplied to summing means 42. Azimuth angle block 32 has an output $\overline{\psi}_r$ which is supplied to a summing means 45. An output of summing means 45 is supplied to a block 46 which is mechanically connected between the thruster engine 44 and a rear propulsion means 48. Block 46 is similar to block 38 and provides a $\psi$ feedback indicative of the direction of propulsion means 48.

Figure 2:
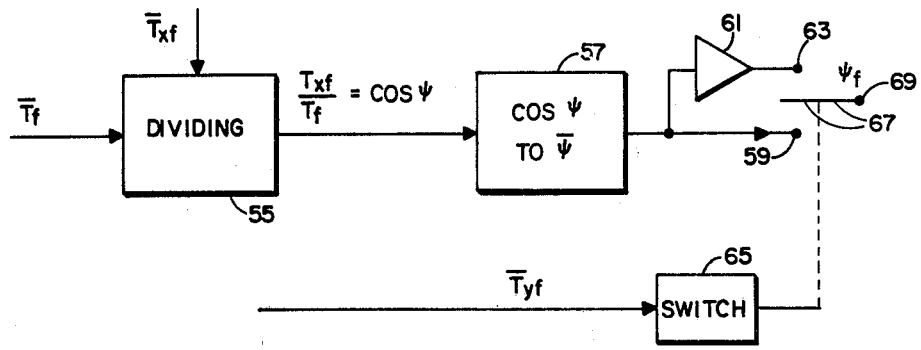
FIGURE 2 is a subsystem block diagram of the blocks in FIGURE 1.

FIGURE 2 is representative of the contents of block 28 in FIGURE 1 and shows as inputs $\overline{T}_f$, $\overline{T}_{xf}$ and $\overline{T}_{yf}$ and and output $\psi_f$. The inputs $\overline{T}_f$ and $\overline{T}_{xf}$ are supplied to a dividing circuit labeled 55 whose output is the dividend of the two inputs and is equal to cosine $\psi$ where $\psi$ is the angle between the vectors $\overline{T}_{xf}$ and $\overline{T}_f$. This output is supplied to a cosine to angle converter 57 whose output is supplied to a terminal 59 and to the input of an inverting amplifier 61 whose output is supplied to a terminal 63. The input $\overline{T}_{yf}$ is supplied to a voltage polarity sensitive switch 65 which is mechanically connected to a movable contact 67 which operates between terminals 59 and 63 and is connected to an output 69 which supplies the output signal $\psi_f$.

Figure 3:
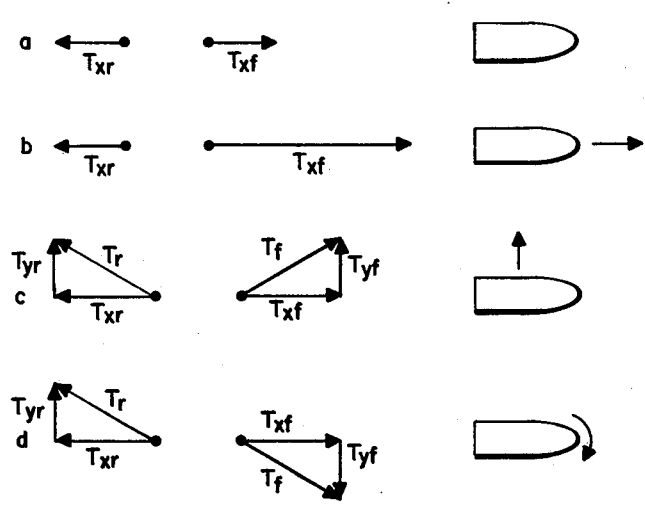
FIGURE 3 is a set of vector diagrams showing the results of operation of the system of FIGURE 1.

In FIGURE 3 the various vector diagrams are labeled by the terminology of the signals in FIGURE 1 and are representative in portions A, B, C, and D respectively of FIGURE 3 of the vessel in a stationary, forward moving, side moving, and rotating condition.

While the block diagram system of FIGURE 1 appears to have complicated contents in the various blocks, further review will disclose that the circuitry for accomplishing the various functions may be quite simple. The blocks 12, 14 and 16 are merely summing means while the blocks 18, 20, 22 and 24 are signal converting means with blocks 22 and 24 additionally summing positive and negative inputs, the polarity or sense of which is dependent on the vessel. As will be later discussed, the engines cannot be reduced below a certain minimum thrust level and still remain operating. Therefore, the converters 18-24 must produce an output in the x direction which is always at least as great as a minimum quantity. Further, the converters 18-24 must account for various factors such as distance of the propulsion means 40 and 48 from the center of rotation of the ship. The thrust vector blocks 26 and 30 provide an output which is indicative of the square root of the sum of the squares of the inputs and may be designed in a manner similar to that shown in an Applications Manual for Computing Amplifiers put out by Philbrick Researches, Inc., second edition, June 1966 on page 94. Of course, many other means of providing the square root of the sum of the squares of the inputs are also available. The contents of one embodiment of the azimuth angle converters 28 and 32 are illustrated in FIGURE 2 wherein the dividing circuit 55 may be of a type shown in the same Philbrick Applications Manual on page 55. The function generator 57 is merely a circuit which when the input varies as the cosine of an angle provides an output which varies directly as the angle. Such a circuit can be implemented by a function generator such as a variable diode function generator 16.338 by Electronic Associates, Inc. who sells such a device for use with their analog computers.

Operation

In discussing the operation of the circuit reference will be made first to FIGURE 3. In FIGURE 3A a balanced condition is shown wherein vectors $T_{xr}$ and $T_{xf}$ are equal in magnitude. This would be the condition wherein both of the thrusters are operating at minimum thrust amplitude and the ship, with equal forward and reverse thrusts, will remain stationary.

In FIGURE 3B the forward thrust is much greater than the reverse thrust, therefore the ship will move in the opposite direction of the thrust and thus move forward.

In FIGURE 3C the forward and reverse thrusts are identical in magnitude but there is also transverse thrust which will move the ship sideways. With the two thrusters directed in the directions of the vectors $T_R$ and $T_F$, the forward and reverse components are canceled out but there is a resultant transverse thrust.

In FIGURE 3D, the vectors $T_R$ and $T_F$ are shown in opposite direction. However, on a ship they would merely be parallel since they are mounted or positioned at points which are on opposite sides of the center of rotation of the ship. Thus, the ship will rotate and since the y and x components cancel there will be no movement forward or sideways but merely a yaw movement.

From the above description it will be realized that the ship can also be made to move to the other side and as well as backwards and any combination of longitudinal and transverse movements in combination with rotational movements by merely repositioning the thrusters to change the direction of thrust.

The longitudinal movement of a vessel requires only approximately 10% of its transverse thrust requirement. Thus, the inefficiency produced by the subtraction of one of the longitudinal thrust vectors from the other longitudinal thrust vector is of little consequence since the ship is easy to move in a longitudinal direction. On the other hand, the thrusters develop substantially full power (in one embodiment approximately 90%) of the total available power to move the vessel in a transverse direction.

Reference will now be made to FIGURE 1 while keeping the above information in mind. The various signals are characterized within blocks 18 and 20 to account for the fact that the force of thrusters cannot be reduced below a predetermined amount. The characterization of blocks 18 and 20 includes means for selectively ignoring some of the signals such as a phase or polarity detector so that commands from 12 for one direction are ignored by block 18 and are ignored by 20 when the command is for movement in the other direction. As previously mentioned, block 26 takes the inputs and provides an output which is the square root of the sum of the squares. Thus, the output has a magnitude which is representative of one of the resultant vectors such as $T_f$ in FIGURE 3C. This result is explained by one of the basic rules in geometry which states that the hypotenuse of a triangle (a resultant vector) can be obtained by taking the square root of the sum of the squares of the two sides of the triangle. Since $\overline{T}_{xf}$ is never reduced to zero, $\overline{T}_f$ will always be a finite value. However, $\overline{T}_f$ provides only vector magnitude information and does not by itself provide angle information.

The angle information is illustrated in FIGURE 1 as $\Psi_f$ for the forward portion of the system and is utilized to keep the thrusters pointed in the desired direction. Since $\Psi_f$ is a signal whose magnitude and sign is indicative of an angle, the feedback can be accomplished in many different ways as previously mentioned.

The force of the thruster engine 36 is dictated by $\overline{T}_f$. The feedback system operates to keep the engine speed proportional to $\overline{T}_f$.

As will be realized by those skilled in the art, the rear thruster control circuit operates in substantially the same manner as the forward thruster control circuitry.

FIGURE 2 illustrates one standard method of obtaining an output signal indicative of the angle between two vectors which have been reduced to absolute magnitude signals. As shown, the two input signals are divided one by the other to obtain a signal which is indicative of a quantity representing an angle. In this case, the quantity which varies in the same manner as the cosine of the angle between the two inputs varies. By running this signal through a cos $\Psi$ to $\Psi$ converter, an output is obtained to be supplied to terminal 59 and amplifier 61 which is directly indicative of the angle between the vectors $\overline{T}_r$ and $\overline{T}_{xf}$. The signal representing vector $\overline{T}_{yf}$ may be positive or negative with respect to a reference thereby indicating the angle of the vector $T_f$. The two different instances are illustrated in FIGURES 3C and 3D. By using this polarity information of signal $\overline{T}_{yf}$ to alter the position of switch 65, the output at terminal 69 can be made to change in polarity even though the two input signals to dividing means 55 do not actually change in sign.

As will be realized by those skilled in the art, if there is zero $\overline{T}_{yf}$ signal so that switch 65 will not operate, the system will still provide the correct $\Psi_f$ output. This is because with zero $\overline{T}_{yf}$ signal into the front thrust vector 26, the output $\overline{T}_f$ will be of the same phase and of the same magnitude as $\overline{T}_{xf}$ and therefore the output of the dividing means 55 will equal 1 which is the cosine of zero degrees.

As will be noted from the above description, there is no reed to reduce the thruster force below a finite minimum amount. Thus, diesel engines may be utilized rather than previously required electrical motors which had to be reduced to a zero value in some instances. As previously explained there will be some inefficiency due to opposition of thrust forces. However, there is continuous thrust level control from zero to approximately 45% of total available power along the longitudinal axis and from zero to approximately 90% of total thrust power available along the transverse or y axis. These figures are based upon typical data for a diesel unit whereein the diesel engine can be reduced to approximately 30% of the maximum r.p.m. and at this r.p.m. produces approximately 10% of the maximum thrust. The 45% power figure seems low at first mention. However, if two thrusters are available and one of these is turned OFF the total available thrust for movement in one direction is 50% of maximum installed thrust. If further the thruster which was previously turned OFF exerts a force of 10% of its maximum thrust and opposing the thruster providing maximum power, the maximum power thruster will be reduced in total vessel thrust capacity by 10% and thus leave only 45% of the total available power to be utilized in moving the vessel.

If only side thrust is required without any rotational thrust, this condition is satisfied by turning all thrusters toward the direction of the side force. The r.p.m. of the front and rear thrusters are simultaneously increased to produce the desired transverse thrust component.

If rotational or yaw movement is desired, the front and rear thrusters are deflected in opposite directions or have unequal y components in the same direction. However, in no event is it necessary for the thruster directions to overlap vectorially. This contributes to stability of the control system and produces greater simplicities in design. This is evident in FIGURE 2 where the circuit complexity would be greatly increased if it were necessary to provide output signals indicative of angles which varied more than 90 degrees from a zero or reference point.

The system as designed produces yaw or rotational moments with y components only and utilizes therefore the most efficient thrust capability of the system.

While only a single vector has been shown for each of the front and rear thrust units and although only a single thruster has been shown in FIGURE 1 for each of these corresponding vectors, it is to be realized that a plurality of thruster units may be used for each of the front and rear units and may be part of the ship's main propulsion system or can be separate therefrom.

In view of the many modifications which may be made to the system to operate in slightly different configurations, I wish to be limited only by the scope of the appended claim wherein I claim:

1. Apparatus for positioning a vessel comprising, in combination;
   means for supplying longitudinal, abeam, and rotational signals as first, second and third signals respectively;
   means for supplying fourth and fifth output signals indicative of the sum and difference of the second and third signals;
   forward and rear thruster means each having first and second inputs for controlling thrust magnitude and thrust direction respectively;
   forward thrust vector adding means connected for receiving said first and fourth signals and for supplying an output sixth signal indicative of the vector addition, of the first and fourth signals, to said first input of said forward thruster means;
   first dividing means connected to said forward thrust vector adding means and connected to said means for supplying said longitudinal first signal for dividing the first and sixth signals and supplying an output seventh signal indicative of the cosine of the angle between the two input vector components;
   first cosine of the angle to angle conversion means connected between said seventh signal output of said first dividing means and said second input means of said propulsion means for supplying thereto a signal indicative of angle of thrust of said propulsion means;
   rear thrust vector addition means connected to said longitudinal signal supply means and to said means for supplying said fifth signal for receiving said first and fifth signals and supplying an eighth signal indicative of the vector addition of said first and fifth signals;
   means supplying said eighth signal to said first input of said rear thruster means;
   second dividing means connected to said means for supplying said longitudinal first signal and to said rear vector addition means for receiving said first and eighth signals and supplying an output indicative of the cosine of the angle between said first and eighth signals;
   second cosine of the angle to angle conversion means connected to said second dividing means and to said second input means of said rear propulsion means for supplying a signal to said rear propulsion means indicaitve of the thrust angle for said rear propulsion means.

References Cited

UNITED STATES PATENTS

| 3,148,653 | 9/1964 | Shatto et al. | 114—144 |
| 3,187,704 | 6/1965 | Shatto et al. | 114—144 |
| 3,311,079 | 3/1967 | Berne | 114—144 |

ANDREW H. FARRELL, Primary Examiner